Nov. 17, 1925.

J. F. ARD 1,562,274

GRASS SEED SEPARATOR

Filed Oct. 26, 1922      3 Sheets-Sheet 1

INVENTOR
*J. F. Ard.*

BY
*H. Winship Wheatley*
ATTORNEY

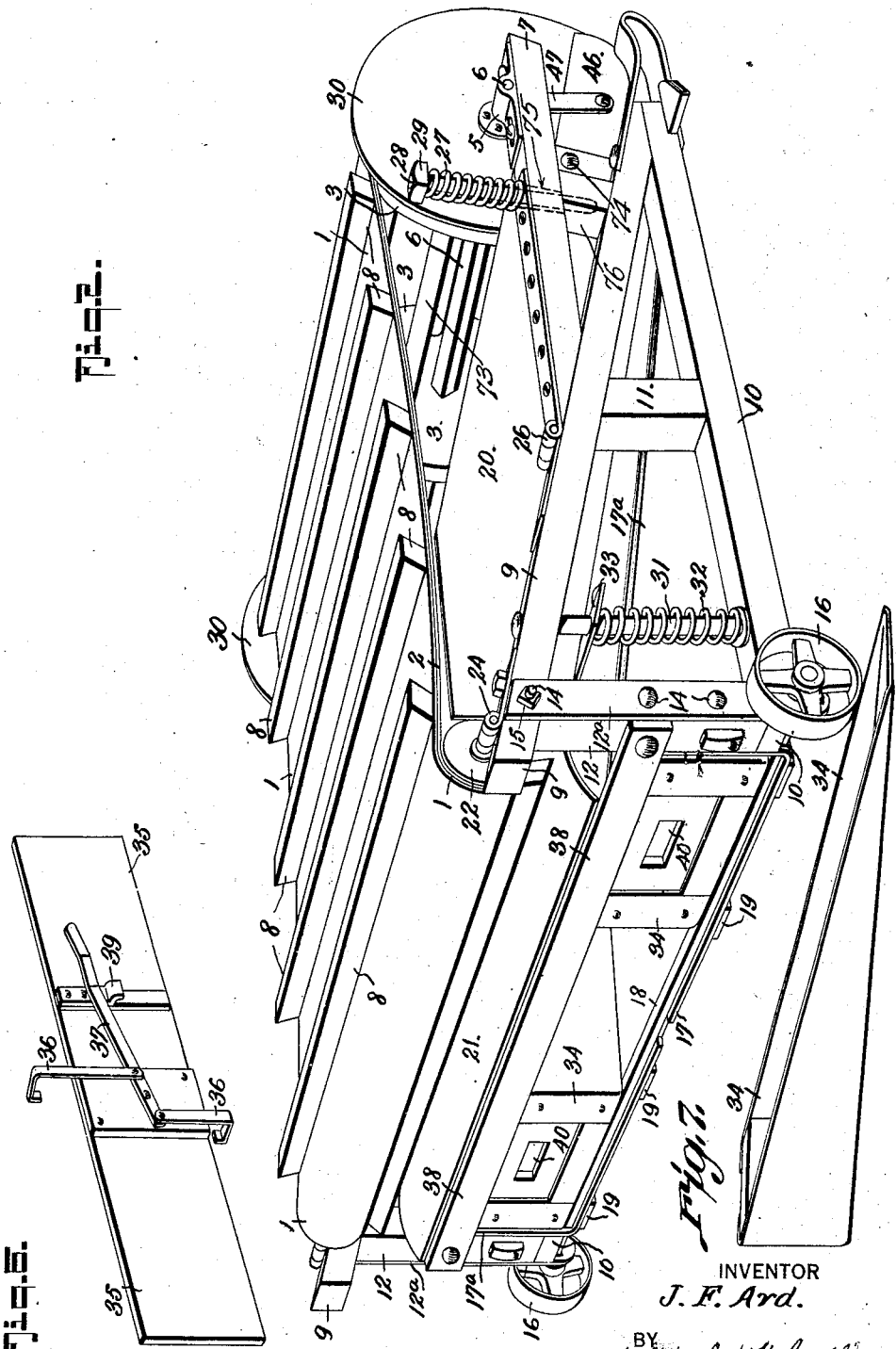

Nov. 17, 1925.
J. F. ARD
1,562,274
GRASS SEED SEPARATOR
Filed Oct. 26, 1922
3 Sheets-Sheet 3
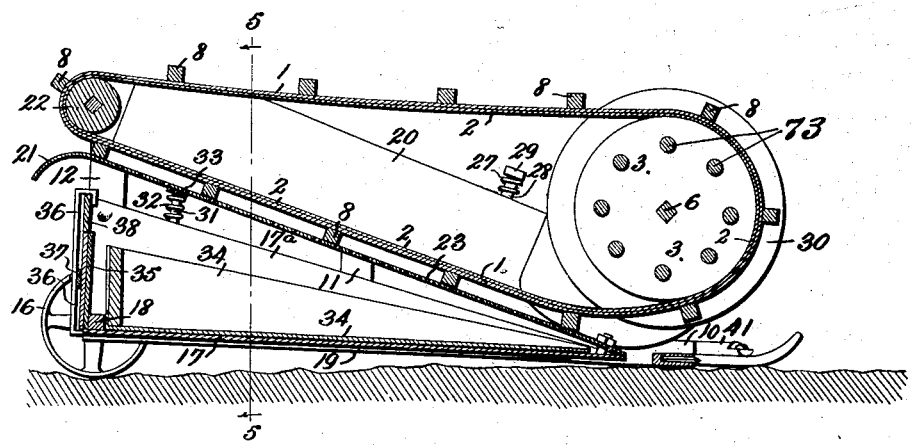
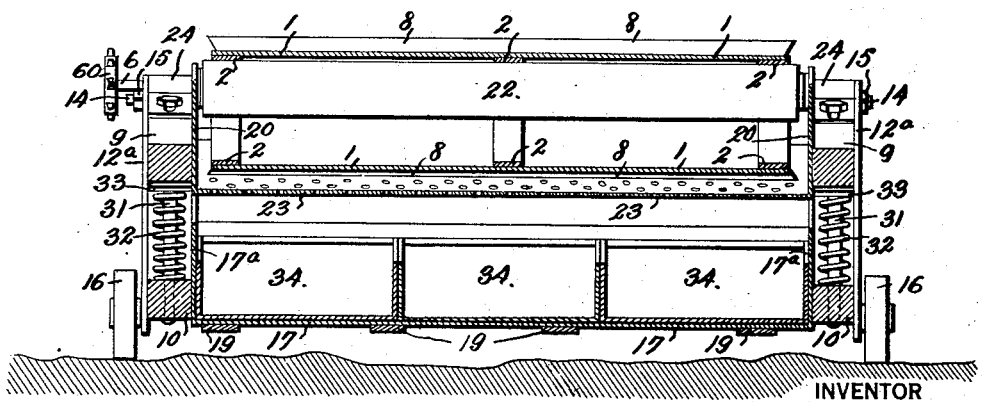
INVENTOR
J. F. Ard.
BY H. Umshyp Wheatley
ATTORNEY Patented Nov. 17, 1925.

1,562,274

UNITED STATES PATENT OFFICE.

JOHN F. ARD, OF JACKSON, LOUISIANA.

GRASS-SEED SEPARATOR.

Application filed October 26, 1922. Serial No. 597,021.

*To all whom it may concern:*

Be it known that I, JOHN F. ARD, a citizen of the United States, residing at Jackson, in the parish of East Feliciana and State of Louisiana, have invented certain new and useful Improvements in Grass-Seed Separators, of which the following is a specification.

This invention is in the nature of an improved construction of grass seed harvester and separator mechanism adapted for being attached to the blade or sickle bar of an ordinary mowing machine, and primarily my said invention has for its object the provision of a mechanism of the character stated, simple and inexpensive, that can be conveniently attached to the blade of a mower without change of construction of the said blade and which includes grass gathering elements, especially designed to allow large clumps of grass to enter the separating element without clogging.

Another object of my invention is to provide, a grass seed separator attachment for mowers having an improved means for conveying the grass along the separator devices and combined with means for shaking the upwardly passing cut grass for effecting the seed separating operation and for ejecting the threshed grass at the rear of the attachment ready for baling.

With other objects in view that will be hereinafter referred to my invention embodies, in a mechanism such as has been generally stated, the peculiar features of construction and novel combination of parts, explained in the following detailed description, specifically set out in the appended claims, and as illustrated in the accompanying drawings, in which:

Figure 3 is the rear end elevation of the attachment and the adjacent end of the mower.

Figure 4 is a longitudinal section of my invention taken substantially on the line 4—4 on Figure 1.

Figure 5 is a transverse section thereof taken on the line 5—5 on Figure 4,

Figure 6 is a detail perspective view of the closure plate.

Figure 7 is a detail perspective view of one of the seed gathering boxes removed from the separator.

Figure 1:
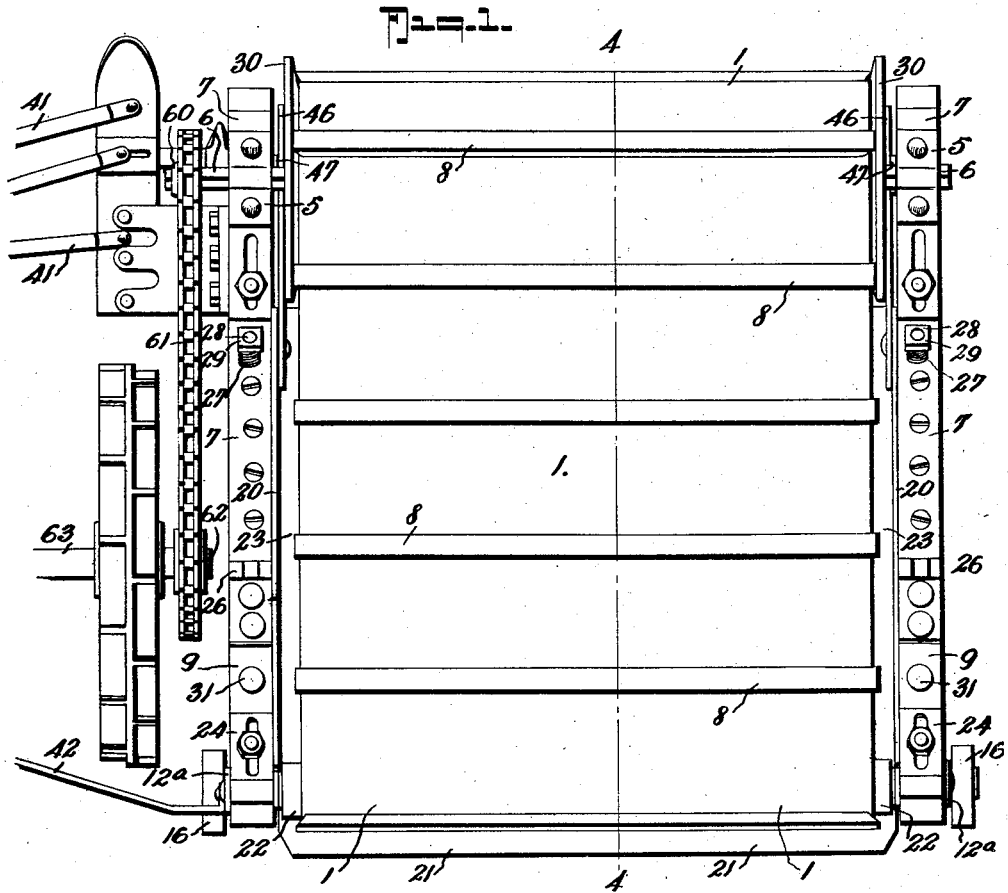
Figure 1 is a plan view of my improved seed harvester and separator, so much of a mowing machine being indicated as is necessary to disclose an operative application of my invention.

In the practical development of my invention, the body or framing of the attachment, in practice, has suitable means for securing it in a relatively rigid manner on the blade or sickle bar of a mowing machine, it being understood from the drawings that when operatively applied to the mowing machine my improved attachment extends rearwardly of the sickle bar of such machine and in the longitudinal plane thereof so that the grass, as it is being cut is deposited in position for being picked up by the gathering and conveying elements.

The grass gathering and conveying elements, best shown in Figure 4, comprise an endless canvas belt 1 that is fixedly attached to a series of endless flexible bands 2 which pass over a series of disks 3—3, of a relatively large diameter, located at the forward end of the machine and over a transverse roller 22, of a smaller diameter than the front band disks 3—3, the said roller 22 having its end journals mounted in bearings 24—24 adjustably secured upon the opposite side bars 9—9 of the main framing of the attachment and presently further referred to.

The forward belt supporting disks 3—3 constitute a part of a drum which includes end disks 30—30 of larger diameter than the disks 3—3 and which constitute guides for the opposite edges of the canvas belts as they pass over the said disks 3. The several disks 3—3 and 30—30 are braced and held in rigid relation by the cross or stay bolts 73—73, as shown.

The drum, that is composed of the disks 3—3 and 30—30 before mentioned, is fixedly mounted on a cross shaft 6 whose opposite ends are journalled in bearings 5—5 located on the forward end of the opposite side beams 7—7, before referred to.

The endless belt 1 is provided with the usual arrangement of transverse slats 8 for gathering the cut grass and conveying it back through the attachment and over the separator elements shown in the drawings and to be presently described.

The opposite side beams 7—7 are horizontally disposed and they are projected forwardly from a pair of oppositely disposed rearwardly and upwardly inclined side beams 9—9 of the main framing, which framing also includes opposite like constructed side portions having horizontally disposed bottom beams 10. The beams 10 are bolted at their forward ends to the front ends of the inclined beams 9—9 and are further connected with the said beams 9—9 by vertical braces 11—12, the rearmost ones 12 of which are faced by irons 12ª secured by bolts 14 and nuts 15, as clearly shown in Figure 2.

A bar or axle 18 extends across the lower rear edge of the attachment and at the opposite ends its carries drag wheels 16—16. The axle 18 also constitutes a support to which a sheet metal bottom plate 17 is secured. 19—19 designate metal drag strips that extend longitudinally of and are bolted to the underside of the plate 17.

The drag plate 17 constitutes the bottom of a trough-like holder, the opposite triangular sides 17ª of which are preferably bent up portions of the said bottom or flat plate 17. The forward end of the plate 17 is closely joined with the front or receiving end of a rearwardly inclined screening bottom 23 which constitutes a part of a sheet metal trough that includes sides 20—20 bent up from the bottom 23 and a rearwardly projected portion 21 that overhangs the rear end of the attachment and facilitates the ejection of the threshed grass as it is discharged to the rear of the machine.

Figure 2:
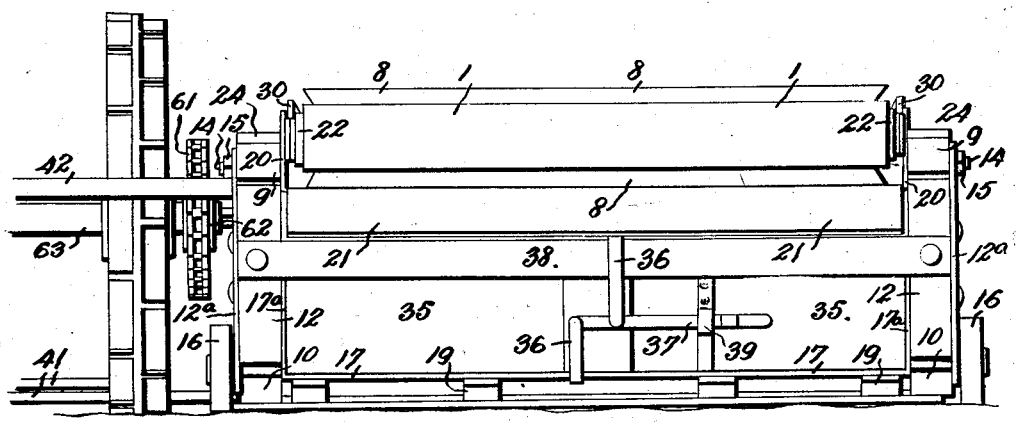
Figure 2 is a perspective view of my invention looking at the rear end thereof.

As is best shown in Figure 2, the side beams 7—7, on whose forward ends the before mentioned drum is journalled, are hinged as at 26, to the inclined beam 9, to swing upwardly against the tension of coil springs 27—27 mounted upon longitudinal bolts 28 which pass through slots 75 in the said beams 7—7 and are secured in the adjacent members 76 of the side frames.

The upper ends of the longitudinal bolts 28—28 are threaded to receive nuts 29—29, the latter constituting the stops for the upper end of the springs 27 and which, when adjusted along the threaded ends of the bolts, provide the desired tension adjustment for the said springs 27—27.

By reason of mounting the drum, over which the endless belt passes, in the manner stated and shown, sufficient vertical flexure of the front end of the gathering belt is at all times present to allow for large clumps of grass to enter into the separating elements and in such manner that clogging is prevented.

The separating trough which, in practice, is shaped up of sheet metal and which is fixedly secured at its forward end only, as before stated and shown in Figure 4, carries a cross bar 33 which is riveted to the underside of the trough near its upper rear end. The bar 33 extends at the opposite ends beyond the trough and under the inclined beams 9—9 and each end of the said bar 33 is apertured for the passage therethrough of the bolts 31 at the corresponding sides of the framing.

The screening trough is fixedly secured at the lower end only and its rear or upper end is yieldably supported on the opposite side springs 32—32 as stated. The front end of the endless gathering belt 1 and the drum that includes the disks 3—3 over which the front end of the belt passes are vertically yieldable by reason of the connections 5, 6, 7, 26, 27 and 28. The separating bottom being thus arranged to move downwardly away from the delivery end of the belt and the said belt at its forward end thus being adapted to move upwardly away from the separating body provision is thereby made against possible clogging of the grass as it is gathered into the combined separating and conveying mechanism, and clogging of the threshed material at the upper or discharging end of the said mechanism is also overcome, thereby providing for uniform gathering and separating actions on the material as it is picked up and caused to travel to and out of the machine over the trough or overhanging end 21, as is clearly shown in Figure 4.

34—34 designate a series of scoop-like boxes, three being shown, and these are provided for gathering the seed separations as they pass through the screen bottom 23, the several boxes 34 are endwise insertable through the open back end of the attachment and are adapted to snugly fit the sides between the underside of the screening bottom and the solid bottom 17.

The axle 18, before mentioned, constitutes a part of a means for holding the boxes 34—34 locked in proper operative position as the attachment is drawn along with the mowing machine to which it is attached. The locking means mentioned includes an upper crossbar 38 whose opposite ends are bolted to the rear uprights 12—12 of the main framing of the attachment.

Cooperative with the bar 38 and the cross members 18 is a closure plate 35 and the said plate is of a length sufficient when applied, to extend across the rear opening of the attachment, through which the boxes 34 are endwise inserted, see Figure 3, by reference to which it will also be noticed that when fitted in place the lower edge of the plate 35 bears against the cross member 18.

As is best shown in Figure 6, the closure plate 35 carries a latch mechanism which includes a control lever 37 pivoted to the plate 35 and whose handle end is adapted for being adjusted into and out of engagement with a latch detent 39.

A pair of oppositely projected hook members 36—36 is pivotally connected at one end to the lever 37 and at opposite sides of its pivot and the said members have their hook-like ends adapted for hooking under the cross member 18 and over the upper edge of the cross bar 38, see Figure 3.

46 designates extensible side guards and they are pivotally supported as at 74 to the inner face of the opposite forward ends of the trough sides 20—20. The guards 46 are hung on links 47 pendent from the front ends of the side beams 7 to cause the front end of the guards 46 to rise vertically with the said beams as the attachment travels along the ground during the mowing operation.

To aid in holding the attachment in proper operative position relatively to the mowing machine, brace rods 41—42 may be secured at one end to the mower frame and their other end to the attachment, as indicated in the drawing.

As is clearly shown in Figure 1, the drum shaft 6 carries a chain wheel 60 which receives the power transmission chain 61 that extends backwardly and passes over the sprocket or chain wheel 62 on the driving axle 63 of the mower, as indicated in Figures 1 and 3.

From the foregoing description, taken in connection with the drawings, the complete construction, the operation and the advantages of my invention will be readily apparent to those familiar with the use and the manufacture of machines of the general type to which my invention relates.

My construction of mounting the supports for the front end of the endless gathering belt on side beams hinged to swing upwardly against the tension of the springs 27—27 allows for large clumps of grass to enter the separating elements without clogging and the grass as it passes along the screening attachment 23 is given a constant shaking, caused by jarring the springs 32—32 that support the rear end of the said attachment 23, it being understood the separations drop into the boxes 34 which have openings 40 in their back ends for conveniently pulling out the fitted boxes when the closure plate 35 has been removed.

What I claim is:

1. In combination with a mower having a cutter bar, a seed separator comprising a seed receiving body; a screening plate, means for yieldably mounting the screening plate above the receiving body; an endless slatted conveyor means for moving the conveyor over the yieldably mounted screening plate in a manner effecting jarring of the said plate at intervals; a frame for supporting the receiving body and plate and the conveyor, and means for securing the frame to the mower in position for causing the grain cut by the cutter bar thereof to fall on said screening plate.

2. In combination with a mower having a cutter bar, a seed separator comprising a seed receiving body; a screening plate, means for mounting the screening plate above the receiving body with one end thereof secured to that body and the other end thereof free; an endless conveyor, means for moving the conveyor over the screening plate in close relation therewith and in a manner for jarring the free end of that plate at intervals; a frame for supporting the receiving body and screening plate and the conveyor, means for securing the frame to the mower in position for causing the grain cut by the cutter bar thereof to fall on said screening plate; and means for yieldably supporting the free end of the screening plate in close relation with the conveyor.

3. In combination with a mower having a cutter bar, a separator comprising a screening bottom that inclines upwardly from its receiving to its discharge end; an endless slatted conveyor belt means for moving said belt over the screening bottom in close relation therewith; said moving means including a small pulley above and adjacent the discharge end and a large pulley above and adjacent the receiving end of the screening bottom, over which pulleys the conveyor belt takes; side plates supported adjacent the screening bottom for preventing seed loss laterally off said bottom; a frame for supporting the screening bottom, the side plates and the small pulley, means for securing the frame to the mower in position for causing the grain cut by the cutter bar thereof to fall on said screening plate; and means for yieldably mounting the large pulley upon said frame.

4. In combination with a mower having a cutter bar, a seed separator comprising a screening bottom that inclines upwardly from its receiving to its discharge end; an endless slatted conveyor belt means for moving said belt over the screening bottom in close relation therewith; said moving means including a small pulley above and adjacent the discharge end and a large pulley above and adjacent the receiving end of the screening bottom, over which pulleys the conveyor belt takes; side plates supported adjacent the screening bottom for preventing seed loss laterally off said bottom; a frame for supporting the screening bottom, the side plates and the small pulley; means for securing the frame to the mower in position for causing the grain cut by the cutter bar thereof to fall on said screening plate; means for yieldably mounting the large pulley upon said frame; and supplemental side plates cooperatively connected to the first mentioned side plates and with the yieldable mounting of large pullley mounting means whereby said supplemental side plates will move with said large pulley.

5. In combination with a mower having a cutter bar, a seed separator comprising a screening bottom that inclines upwardly from its receiving to its discharge end; an endless slatted conveyor belt, means for moving said belt over the screening bottom in close relation therewith; said moving means including a small pulley above and adjacent the discharge end and a large pulley above and adjacent the receiving end of the screening bottom, over which pulleys the conveyor belt takes; side plates supported adjacent the screening bottom for preventing seed loss laterally off said bottom; a frame for supporting the screening bottom, the side plates and the small pulley, means for securing the frame to the mower in position for causing the grain cut by the cutter bar thereof to fall on said screening plate; and means for yieldably mounting the large pulley upon said frame at a point above and in advance of the cutter bar of the mower.

6. In combination with a mower having a cutter bar, a seed separator comprising a screening bottom that inclines upwardly from its receiving to its discharge end; an endless slatted conveyor belt, means for moving said belt over the screening bottom in close relation therewith; said moving means including a small pulley above and adjacent the discharge end and a large pulley above and adjacent the receiving end of the screening bottom, over which pulleys the conveyor belt takes; side plates supported adjacent the screening bottom for preventing seed loss laterally off said bottom; a frame for supporting the screening bottom, the side plates and the small pulley; means for securing the frame to the mower in position for causing the grain cut by the cutter bar thereof to fall on said screening plate; means for yieldably mounting the large pulley upon said frame; and supplemental side plates pivoted to the first mentioned side plates in cooperative relation therewith and link connected to the large pulley mounting means whereby said supplemental plates will move with said large pulley.

7. An attachment for mowing machines having a drive shaft comprising a supporting frame, means for fixedly connecting the frame with and in the longitudinal plane of the mowing machine; the said attachment including a screening bottom that inclines upwardly from its receiving to its discharging end; an endless slatted gathering belt, means for supporting the belt to constrain it to travel along and in close relation to the screening bottom, means for imparting motion to the endless belt, the said means including a belt driving shaft having a gear, means for connecting the gear mechanism to the drive shaft of the mowing machine; means for yieldably supporting the forward end of the gathering belt to permit yielding vertical movement away from the entrance end of the screening bottom, and means for yieldably supporting the discharge end of the screening bottom, for permitting vertical movement downwardly away from the endless belt that passes thereover.

8. An attachment for mowing machines for the purpose stated comprising a supporting frame adapted for being fixedly connected with and in the longitudinal plane of the mowing machine behind the cutter bar thereof; the said attachment including a screening bottom that inclines upwardly from its receiving to its discharging end; an endless slatted gathering belt, means for supporting the belt to constrain it to travel along and in close relation to the screening bottom; means for imparting motion to the endless belt, the said means including a belt driving shaft having a gear adapted for connection, through power transmission mechanism, with a driven shaft of the mowing machine; means for yieldably mounting the gathering belt above and in advance of the mowing machine cutter bar for permitting yieldable vertical movement away from the entrance end of the screening bottom, and means for yieldably supporting the discharging end of the screening bottom for permitting yielding vertical movement downwardly away from the endless belt that passes thereover.

9. In combination with a mower having a cutter bar, a seed separator comprising a screening bottom that inclines upwardly from its receiving to its discharge end; an endless slatted conveyor belt means for moving said belt over the screening bottom in close relation therewith; said moving means including a small pulley above and adjacent the discharge end and a large pulley above and adjacent the receiving end of the screening bottom, over which pulleys the conveyor belt takes; side plates supported adjacent the screening bottom for preventing seed loss laterally off said bottom; a frame for supporting the screening bottom, the side plates and the small pulley; means for securing the frame to the mower in position for causing the grain cut by the cutter bar thereof to fall on said screening plate; means for yieldably mounting the large pulley upon said frame; and supplemental side plates arranged in cooperative relation with the first mentioned side plates and connected with the yieldable mounting for the large pulley whereby the said supplemental plates will move with said large pulley while maintaining their cooperative relation with said first mentioned side plates.

10. The combination with a mowing machine including a sickle bar; of a seed separator carried by the said machine and adapted to receive the cuttings from the sickle bar and thresh the same, the said separator including an upwardly and rearwardly inclined screening bottom, an endless belt for gathering the cut grass, means for continuously passing the belt over the screened bottom from its receiving to its discharging end, other means for gathering the seed separated from the grass as it is passed up over the screening bottom, and means for yieldably mounting that end of the endless gatherer that works over the receiving end of the screening bottom to provide for vertical movement of the said end of the gatherer and other means for yieldably mounting the discharging end of the screening bottom to adapt it to move away from the endless gatherer and provide for the free passing of the material over the rear end of the machine.

11. The combination with a mowing machine including a sickle bar; of a seed separator carried by the said machine and adapted for receiving the grass cuttings from the sickle bar and thresh the same, the said separator including an endless belt slatted conveyor for elevating the cuttings, means for screening the seed, means operable from the mowing machine for driving the separating mechanisms, the said driving means including a drum having disks over which the endless conveyor belt passes, a shaft connecting the drum disks, opposite frame beams on which the opposite ends of the shaft journal, one end of the shaft having a transmission gear adapted for being coupled with a driven element on the mower, the said opposite beams being hingedly joined to the main frame to swing upwardly with the belt engaged drum, tension devices engaging the hinged beams and tending to normally swing the said beams to a horizontal position to adjust the endless belt to convey the material up over the screening means.

12. In a grass gathering and threshing attachment for mowing machines, a framing composed of opposite side portions each including upwardly and rearwardly inclined side beams, a horizontal beam and vertical beams connecting the horizontal and inclined beams, and an outwardly projected horizontal beam, each horizontal beam being hinged at its inner end to its respective inclined side beams, tension devices tending to normally hold the hinged beams to their horizontal position, a closed bottom plate located between the opposite horizontal beams, a screening bottom whose front end is fixedly secured to the front end of the closed bottom plate, the said screening bottom being inclined from its lower to its upper end, means for yieldably supporting the upper free end of the screening bottom, an endless slatted belt conveyor, a pulley support for the front end of the belt conveyor, the said support being mounted upon the outer end of the hinged side beams, a stationary pulley that extends transversely between the upper ends of the inclined beams and over which the endless belt passes, the shaft of the belt pulley at the front end having a power transmission receiving gear.

13. In an attachment for mowing machines of the character described, a framing, an upwardly and rearwardly inclined screening bottom mounted thereon, a slatted endless gathering belt mounted on the framing, means for imparting continuous movement of the belt along the screening bottom, the said framing including a substantially horizontal supporting bottom, a box insertable through the open end of the supporting bottom to rest on the said bottom and adapted to gather the separations as they pass through the screening bottom, a closure plate that fits over the open rear end of the framing and holds the seed receiving box against being pulled out, and a lever and detent mechanism for holding the said closure plate to its operative condition.

14. In an attachment for mowing machines of the character described, a framing, an upwardly and rearwardly inclined screening bottom mounted thereon, a slatted endless gathering belt mounted on the framing, means for imparting continuous movement of the belt along the screening bottom, the said framing including a substantially horizontal supporting bottom, a box insertable through the open end of the supporting bottom to rest on the said bottom and adapted to gather the separations as they pass through the screening bottom, a closure plate that fits over the open rear end of the framing and holds the seed receiving box against being pulled out, a lever and detent mechanism for holding the said closure plate to its operative condition, the said detent and lever mechanism including upper and lower cross bars attached to the rear end of the bottom frame, oppositely adjustable toggle hooks and a lever pivotally attached to the closure plate, the said toggle hooks being adapted for clamping over the upper and lower cross bars under proper shifting of the lever.

JOHN F. ARD.